Patented May 14, 1940

2,200,715

UNITED STATES PATENT OFFICE 2,200,715

CONVERSION PRODUCTS OF RUBBER

Arthur Greth and Johannes Reese, Wiesbaden, Germany, assignors to The Resinous Products & Chemical Company, Philadelphia, Pa.

No Drawing. Application June 10, 1937, Serial No. 147,479. In Germany July 6, 1936

4 Claims. (Cl. 260—768)

This invention relates to a process whereby rubber, either vulcanized or unvulcanized, can be converted into a thermoplastic material suitable for use in coating compositions.

The particular properties of rubber such as elasticity and toughness as well as its mechanical and chemical stability make it a very desirable material for use with other materials for the preparation of coating compositions. However, its incompatibility with the other materials used in such compositions and the high viscosity of its solutions have prevented a more general use of rubber for this purpose.

It has now been found that by treatment with certain reagents rubber can be converted to products of relatively low viscosity and which have other properties which render them very suitable for use in coating materials and adhesives.

The isomerizing action which some acids exert on rubber in the presence of phenol is well known. According to the process of the German Patent No. 571,133 a solvent is used and the conversion of the rubber is carried out near the boiling point of this solvent in the course of considerable time (several days). In this patent there is also mentioned a known process according to which rubber is subjected to the action of concentrated sulfuric acid in the presence of phenol apparently without a solvent. As stated in this patent, however, no isomerization products of the rubber are formed but instead there are complex compounds which probably result from the reaction between sulfuric acid and the phenol thus forming phenol-sulfonic acids. According to the process of the German Patent No. 538,941 certain materials are added to rubber which on heating with phenol split out an isomerizating agent such, for instance, as hydrochloric acid or similar acids and the heating is continued for many hours, under some circumstances for days. According to German Patent No. 487,776 undissolved rubber is heated with sulfuric acid or the like for several hours. Mention is also made in this patent of the addition of phenol but it is expressly stated that this reacts with the sulfuric acid forming phenol-sulfonic acid which then reacts with the rubber. As already mentioned above in discussing Patent No. 571,133 such treatment does not yield isomerization products of rubber but results in complex compounds. Furthermore, all of these known processes have one thing in common, namely: they require a long reaction time.

It has now been found, contrary to these known processes, that a far-reaching isomerization of the rubber may be attained in a simple manner by heating a mixture of phenol, rubber and an acid which does not enter into combination with the phenol to the boiling point of the phenol in the absence of any rubber solvent. In this manner it was unexpectedly found that the time of reaction is considerably shortened. If the mixture of rubber and phenol is well stirred, the conversion of the rubber, particularly with small batches, is complete in about twenty minutes. The reaction time, therefore, only amounts to a very small fraction of the time required according to the previously known processes. A further, decided advantage of the new method is that the conversion products of rubber obtained have a considerably lower viscosity than those made according to the previously known processes. It has been shown that the known conversion products have a viscosity which is two to four times as great as that of the product made according to the new process. This reduction in viscosity permits the conversion products of the rubber to be used for coatings and lacquers in a normal way, and the exceptional ability to form films combined with excellent resistance to acids and alkalies make the new products exceptionally well suited for coating purposes.

According to the present process it is possible to prepare a rubber product of such low viscosity that a 40–50 per cent. solution of it may be used as a coating material. The analysis shows that this conversion product is an isomer of rubber. Since the number of double bonds is considerably less than in the original rubber, it may be assumed that the product is partially cyclicized and from the considerable reduction in viscosity it is evident that a disintegration of the rubber molecule must have taken place.

In place of phenol itself all other mono- and polyhydric phenols may be used, either alone or in mixture with each other, insofar as they are not acted upon by the acid. Derivatives of phenol, such as p-chlorphenol or salicylic acid, also yield usable products whereas phenol ethers are much less suitable.

Besides the ordinary commercial kinds of rubber, as well as latex, vulcanized rubber may also be used in which case a considerable desulfurization takes place. Thus, it is possible to convert scrap and old rubber of various kinds with or without fillers into valuable conversion products of rubber. Of the acids which may be used in the process, the hydrogen halides in gaseous form or in solution are the most suitable, but other acids which do not yield compounds with phenols such, for instance, as phosphoric, boric, sulfurous or trichloracetic acid are also very suitable. Amphoteric salts, such as aluminum chloride, zinc chloride and tin chloride, may be used in place of or in conjunction with the acids but the conversion products obtained by means of these isomerizing agents tend to be brittle.

The relative amounts of phenols or rubber used are such that there is always an excess by weight of phenol present. After completion of the reaction, the excess phenol may be removed and used for another batch.

The product may be separated from the phenol and the acid by steam distillation of the product itself or a solution thereof. It may also be separated by precipitating it from a solution or by pouring the reaction product into hot caustic solution and finally washing with water.

The conversion products of rubber obtained according to this process are soluble in benzol, chlorinated hydrocarbons, petroleum hydrocarbons and turpentine. They are insoluble in alcohols, esters, ethers, ketones and acids, all of which will precipitate the conversion products from their solutions.

Solutions of the conversion products resemble resin solutions and therefore may be applied or sprayed like a resinous coating material. The films thus obtained are characterized by a smooth flow and good surface and are particularly resistant to heat up to above 200° C. The action of heat leads, in fact, to a certain hardening of the film similar to that obtained in the hardenable artificial resins and with increasing baking temperature the resistance to benzol and benzene becomes greater. This high resistance to heat makes the rubber conversion products particularly suitable for the preparation of packing and for similar purposes.

Example 1

25 parts of pale crepe rubber and 100 parts of phenol are heated to 170° to 180° and, as soon as the phenol is melted, gaseous hydrogen chloride is led in. In the course of a quarter to a half hour the rubber is converted into a resinous mass and at the end of an hour at most the conversion is complete. The reaction product floats on the phenol and can be removed. On cooling it solidifies to a tough, solid, yellow to red colored resin which can be freed from the remaining phenol by repeated precipitation from its toluol solution with alcohol.

Example 2

25 parts of rubber, 100 parts of butyl phenol and 10 parts of o-phosphoric acid are heated for an hour to 210° C. The reaction product which is floating on the butyl phenol is separated and freed from any occluded butyl phenol by milling on hot rollers and is finally steam distilled to remove the last traces of the phenol.

Example 3

25 parts of vulcanized scrap rubber, 100 parts of cresol and 25 parts of concentrated hydrochloric acid are heated for a half hour to 200° to 220° C. Hydrogen sulfide is evolved with the hydrochloric acid vapors. The conversion product obtained in this case is separated from the cresol by means of dilute caustic solution.

We claim:

1. The process of isomerizing rubber which includes the step of heating a mixture composed of rubber, an excess by weight of a phenol, and an inorganic acid which does not react with the phenol to the boiling point of said phenol.

2. The process of isomerizing rubber which includes the step of heating a mixture composed of rubber, an excess by weight of a phenol, and hydrogen chloride to the boiling point of said phenol.

3. The process of isomerizing rubber which includes the step of heating a mixture composed of rubber, an excess by weight of a phenol, and phosphoric acid to the boiling point of said phenol.

4. The process of isomerizing rubber which includes the step of heating a mixture composed of vulcanized rubber, an excess by weight of a phenol, and an inorganic acid which does not react with the phenol to the boiling point of said phenol.

ARTHUR GRETH.
JOHANNES REESE.